United States Patent [19]

Manabe

[11] Patent Number: 5,502,776

[45] Date of Patent: Mar. 26, 1996

[54] METHOD AND APPARATUS SELECTIVELY SETTING AN IMAGE PROCESSING CONDITION

[75] Inventor: Naoki Manabe, Yokohama, Japan

[73] Assignee: Canon Kabushiki Kaisha, Tokyo, Japan

[21] Appl. No.: 379,005

[22] Filed: Jan. 27, 1995

Related U.S. Application Data

[63] Continuation of Ser. No. 77,497, Jun. 17, 1993, abandoned, which is a continuation of Ser. No. 651,561, Feb. 6, 1991, abandoned.

[30] Foreign Application Priority Data

Feb. 20, 1990 [JP] Japan ........................................ 2-37218

[51] Int. Cl.$^6$ ........................................................ G06K 9/36
[52] U.S. Cl. ........................ 382/172; 382/270; 358/466
[58] Field of Search ................................. 382/18, 50, 51, 382/53, 172, 270, 271, 272, 273; 358/429, 430, 455, 456, 458, 466; H04N 1/40

[56] References Cited

U.S. PATENT DOCUMENTS

| | | | |
|---|---|---|---|
| 4,804,842 | 2/1989 | Nakajima | 250/327.2 |
| 4,837,450 | 6/1989 | Satomura et al. | 250/571 |
| 4,899,194 | 2/1990 | Hori | 355/56 |
| 4,907,286 | 3/1990 | Yamada | 382/51 |
| 4,929,979 | 5/1990 | Kimoto et al. | 355/38 |
| 4,977,605 | 12/1990 | Fardeau et al. | 382/51 |
| 5,003,616 | 3/1991 | Orita et al. | 382/41 |
| 5,053,888 | 10/1991 | Nomura | 358/458 |

Primary Examiner—Leo Boudreau
Assistant Examiner—Andrew W. Johns
Attorney, Agent, or Firm—Fitzpatrick, Cella, Harper & Scinto

[57] ABSTRACT

An image reading apparatus forms a histogram of image density levels of image signals obtained by reading an image, and processes the image signals in accordance with the histogram. When the histogram is improper for image processing, the apparatus indicates the improperness.

14 Claims, 8 Drawing Sheets

METHOD AND APPARATUS SELECTIVELY SETTING AN IMAGE PROCESSING CONDITION

This application is a continuation of application Ser. No. 08/077,497 filed Jun. 17, 1993, now abandoned, which is continuation of application Ser. No. 07/651,561 filed Feb. 6, 1991, now abandoned.

BACKGROUND OF THE INVENTION

1. Field of the Invention

This invention relates to an image reading apparatus, and, for example, to an image reading apparatus which can read a projection image magnified from a microfilm, perform image processing, such as contrast correction and the like, and output the resultant image signals to an image forming apparatus, such as an LBP (laser-beam printer) or the like.

2. Description of the Related Art

A configuration has been known wherein an image recorded on a recording material, such as paper or the like, or on a film, such as a microfilm or the like, is photoelectrically read, image recording is performed according to image signals obtained by the reading, and the image signals are, for example, stored.

In such a configuration, in order to always obtain excellent image signals irrespective of the density and contrast of an image to be read, the density and contrast of the image are measured in advance, and the threshold value used for binary-coding the image signals, a parameter for density correction, the amount of exposure of the image, and the like are controlled according to the result of measurement.

The assignee of the present application has proposed image reading apparatuses which have a function to determine the threshold value for a binary-coding operation according to the result of measurement of the density and contrast of an image, in, for example, U.S. Pat. Nos. 4,907,286 and 4,837,450.

For example, in U.S. Pat. No. 4,837,450, a magnified projection image of a microfilm is read by a line sensor, such as a CCD (charge-coupled device) or the like, and a density histogram is formed from image signals obtained by the reading. A threshold value for a proper binary-coding operation is determined from the density distribution of the histogram, and binary-coded image signals are output to an image forming apparatus.

FIG. 7 illustrates a density histogram thus obtained. In general, a negative film is mostly used as a microfilm. Hence, density distribution portion 101 corresponds to a base (background) portion, and density distribution portion 102 corresponds, for example, to character portions. If the density data having a peak in frequency in the distribution portion 101 is represented by $P_{b1}$, and the density data having a peak in frequency in the distribution portion 102 is represented by $P_{w1}$, the threshold value $T_1$ is expressed by the following expression:

$$T_1 = (P_{b1} + P_{w1})/2 \quad (1).$$

When an original is photographed on a microfilm, an image fogged over the entire region of the film is obtained in some cases due to improper exposure time or developing process. In such a case, the density histogram shifts to the black side as a whole, as shown in FIG. 8A. When such image data are subjected to density adjustment processing with 256 gradations, the maximum value $D_{max1}$ in the data is obtained, and respective data are multiplied by $(256/D_{max1})$. Thus, a density histogram as shown in FIG. 8B is obtained. By performing such contrast correction, the threshold value $T_2$ can be obtained in the same manner as described above:

$$T_2 = (P_{b2} + P_{w2})/2 \quad (2).$$

When a diazo film is used as a microfilm, remarkable fading occurs due to natural light, transmitted light in a reader printer or the like. Hence, the density histogram shifts to the white side as a whole, as shown in FIG. 9. When processing such image data with 256 gradations, the minimum value $D_{min2}$ and the maximum value $D_{max2}$ of the data are obtained, the value $D_{min2}$ is subtracted from respective data $D_{n2}$ between the above-described two values $D_{min2}$ and $D_{max2}$, and the resultant values are multiplied by $\{256/(D_{max2} - D_{min2})\}$. Thus, a density histogram as shown in FIG. 8B is obtained. By performing such contrast correction, the threshold value can be obtained in the same manner as in the above-described two examples.

In the above-described examples, however, in order to determine the threshold value, the peak value $\overline{Pb}$ of the distribution portion corresponding to base (background) portions and the peak value $\overline{Pw}$ of the distribution portion corresponding to character portions must be present. In some cases, however, only one peak value is present, as shown in FIG. 10, or three or more peaks are present, as shown in FIG. 11.

The above-described cases may occur if many halftone portions are present as in a photograph or the like, or if characters are inserted in part of a photograph, or a frame is present around an image. The above-described approach has the following disadvantages: When constrast is low as in the above-described cases, the threshold value cannot be determined by the above-described method. Even if peak values are present, it is very difficult to determine a proper threshold value. Binary-coded image signals obtained from temporarily-determined threshold value are hard to be read, or in some cases impossible to read.

SUMMARY OF THE INVENTION

The present invention has been made in consideration of the above-described problems.

It is an object of the present invention to provide an image reading apparatus which can accurately read images having various characteristics.

It is a further object of the present invention to provide an image reading apparatus which can easily notify an operator of incorrect of image processing according to the result of measurement of the density and contrast of an image.

It is a still further object of the present invention to provide an image reading apparatus which can prevent useless image reading when image processing, according to the result of measurement of the density and contrast of an image, cannot be properly performed.

It is still another object of the present invention to provide an image reading apparatus which can accurately read an image even if image processing, according to the result of measurement of the density and contrast of the image, cannot be properly performed.

According to one aspect of the present invention, an image reading apparatus is provided in which a histogram is formed of image density levels read from an image and a discrimination is made as to whether the histogram is suitable for use in image processing. The result of the discrimination is preferably indicated to an operator, such as by means of a visual display.

According to another aspect of the present invention, an image reading apparatus is provided in which processing means processes read image signals in accordance with a parameter set by setting means in accordance with a histogram of image density levels of the image signals. In a second mode, the setting means sets the parameter in accordance with an image density level of a particular image signal.

These and other objects and effects of the present invention will become more apparent from the following description taken in connection with the accompanying drawings.

DETAILED DESCRIPTION OF THE PREFERRED EMBODIMENT

The preferred embodiment of the present invention will now be particularly explained in detail with reference to the drawings.

Figure 1:
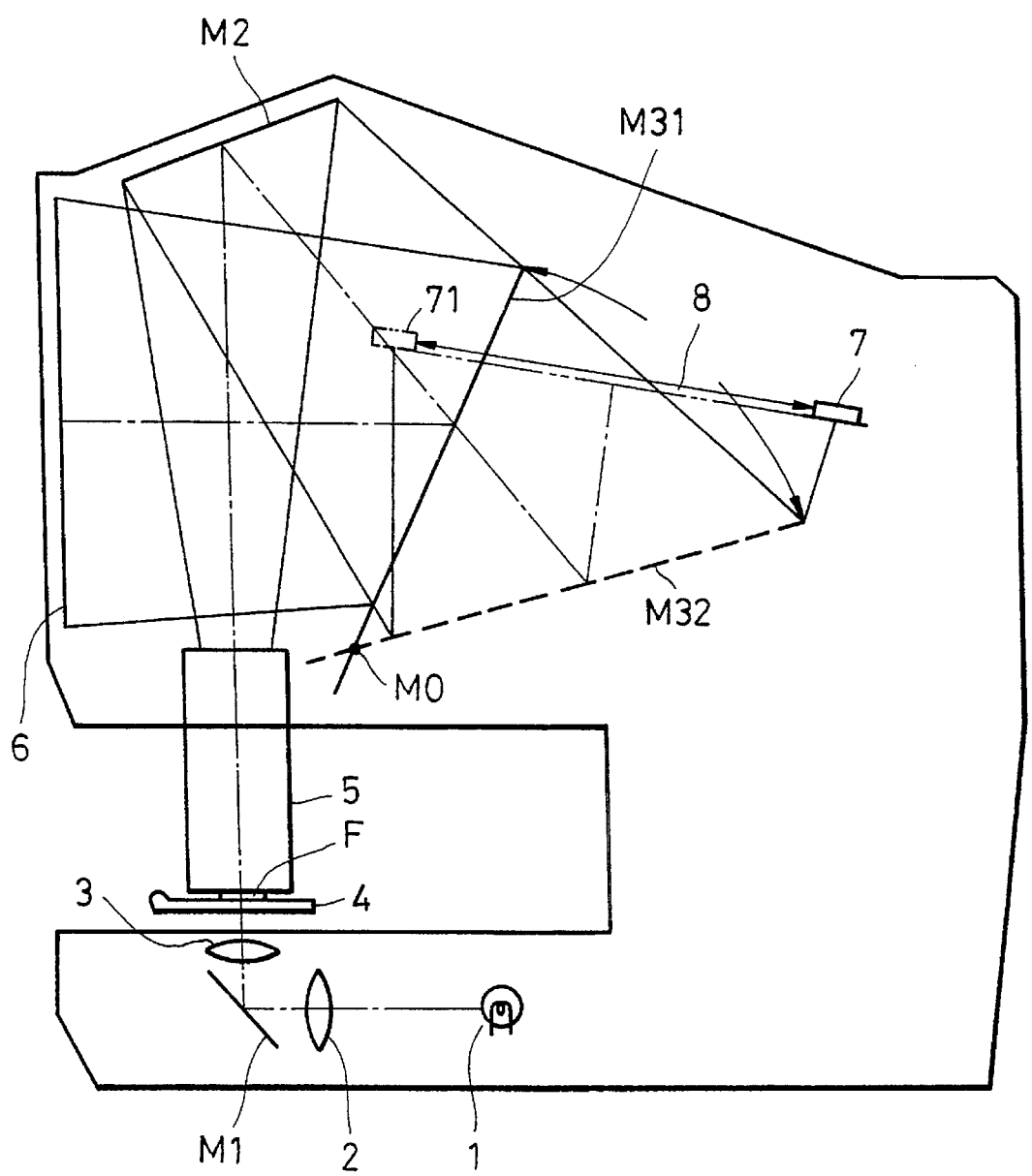
FIG. 1 is a diagram showing the configuration of an embodiment of the present invention.

FIG. 1 shows an embodiment wherein the present invention is applied to a microfilm reader. First, a microfilm image reading unit of an image reading apparatus will be explained. In FIG. 1, light from an exposure lamp 1, serving as a light source, is condensed by a condenser lens 2, is upwardly reflected by a mirror M1, is then condensed by a condenser lens 3, and illuminates a microfilm F secured by a film carrier 4 from below. An image on the microfilm F is magnified by a projection lens 5, and is then reflected by mirrors M2 and M31 for projection on a screen 6. This optical path is hereinafter termed a monitor optical path. The operator can thereby monitor the image of the microfilm F on the screen 6.

Next, a reading optical path will be explained. For example, a contact-type line sensor capable of reading an image on one line by resolving it into 500 picture elements is used as a photosensor 7. When the start of image reading has been commanded from an operation unit (e.g., a control panel) or the like, the mirror M31 is rotated to position M32 around point M0, and is then stopped. Subsequently, reading of the entire image of the microfilm F is performed by moving (subscanning) the photosensor 7 along the imaging surface 8 in the leftward direction, to position 71. The photosensor 7 remains at the right-end position on its path, as shown in FIG. 1, except when performing image reading.

Figure 2:
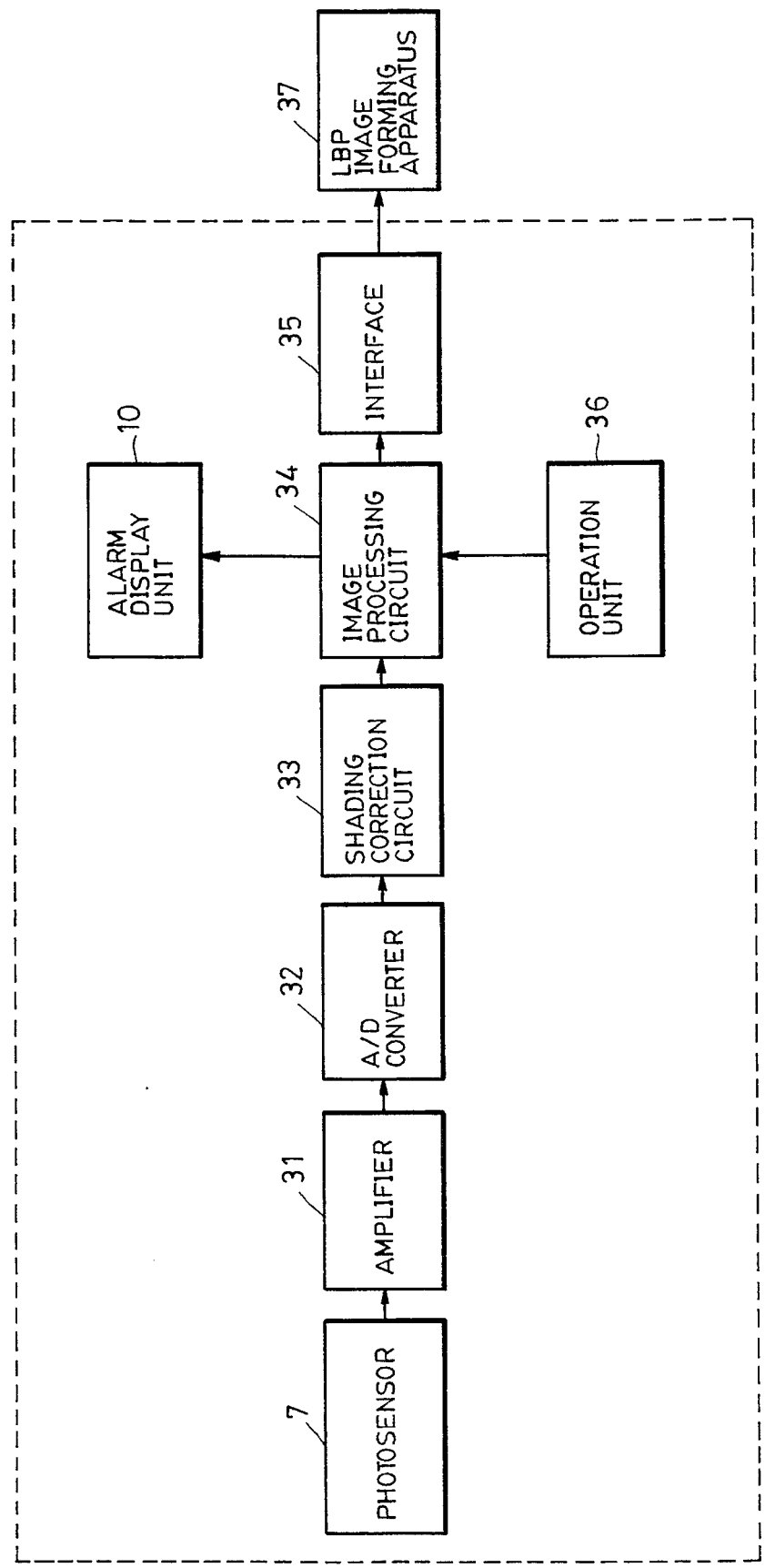
FIG. 2 is a block diagram of the configuration of circuitry in the embodiment of FIG. 1.
Figure 3:
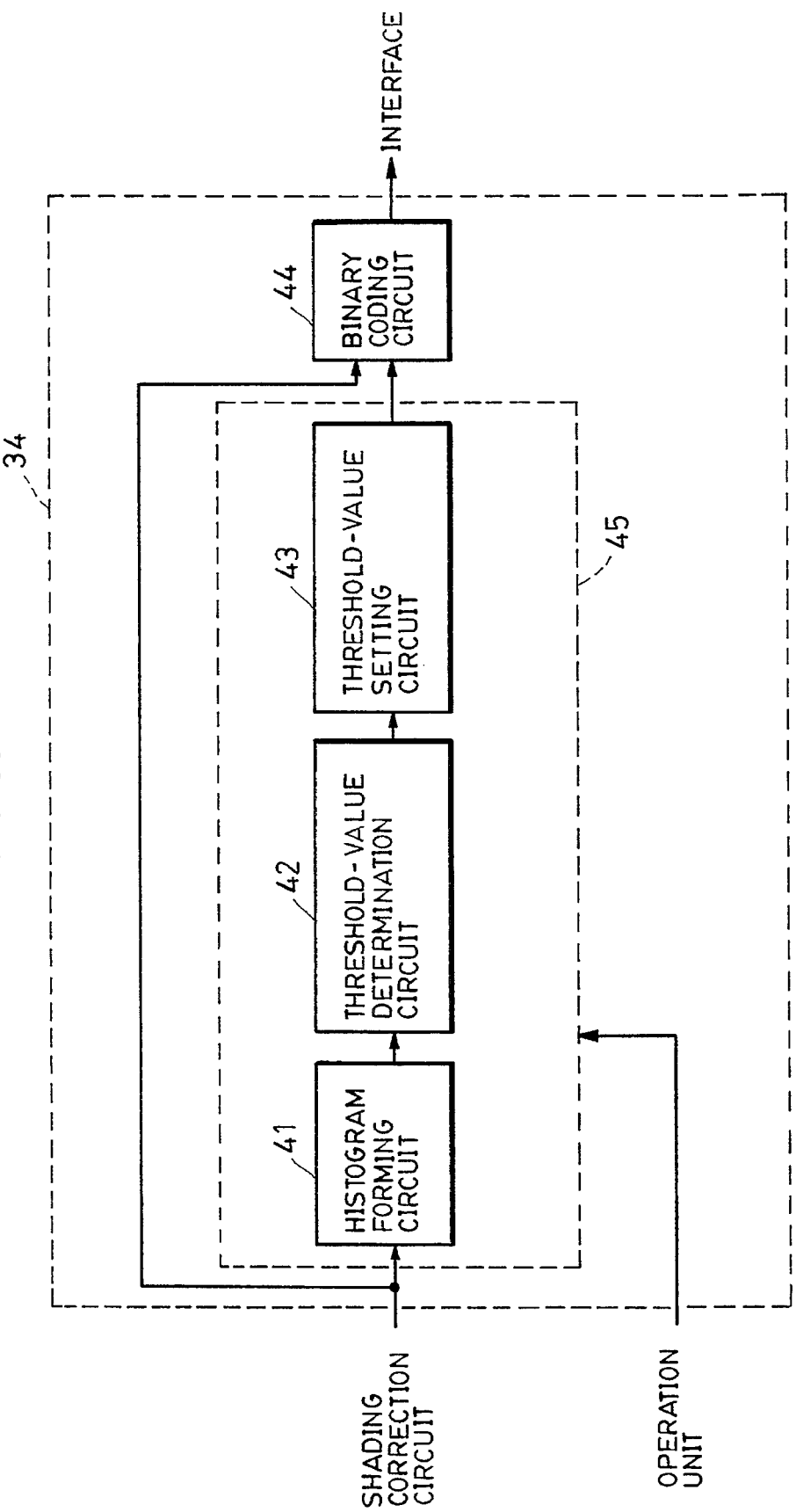
FIG. 3 is a diagram showing the configuration of the image processing circuit of FIG. 2.

FIG. 2 is a block diagram showing the configuration of circuitry according to the present invention. The magnified image obtained from the microfilm F is subjected to photoelectric conversion by the photosensor 7. The resultant image signals are amplified by an amplifier 31, and are input to an image processing circuit 34 via an A/D converter 32 and a shading correction circuit 33. The signals are then subjected to image processing by the image processing circuit 34, and are output to an image forming apparatus 37, such as an LBP (laser beam printer) or the like, via a printer interface circuit 35. As shown in FIG. 3, the image processing circuit 34 includes a density histogram forming circuit 41, a determination circuit 42 for determining whether or not the threshold value for obtaining binary image signals is proper or suitable for accurate, high-quality image processing, a threshold-value setting circuit 43, and a binary coding circuit 44, and performs image processing according to a procedure which will be described later.

That is, in the present embodiment, the histogram forming circuit 41, the determination circuit 42 and the threshold-value setting circuit 43 are configured by a well-known microcomputer 45 having a RAM (random access memory) for forming histograms. By means of a program (to be described later) for image processing written in advance in a ROM (read-only memory) incorporated in the microcomputer 45, a threshold value for performing binary coding of image signals is determined by software processing. The threshold-value determination may be performed not only by software processing but also by hardware processing using a combination of logical operators.

Figure 4:
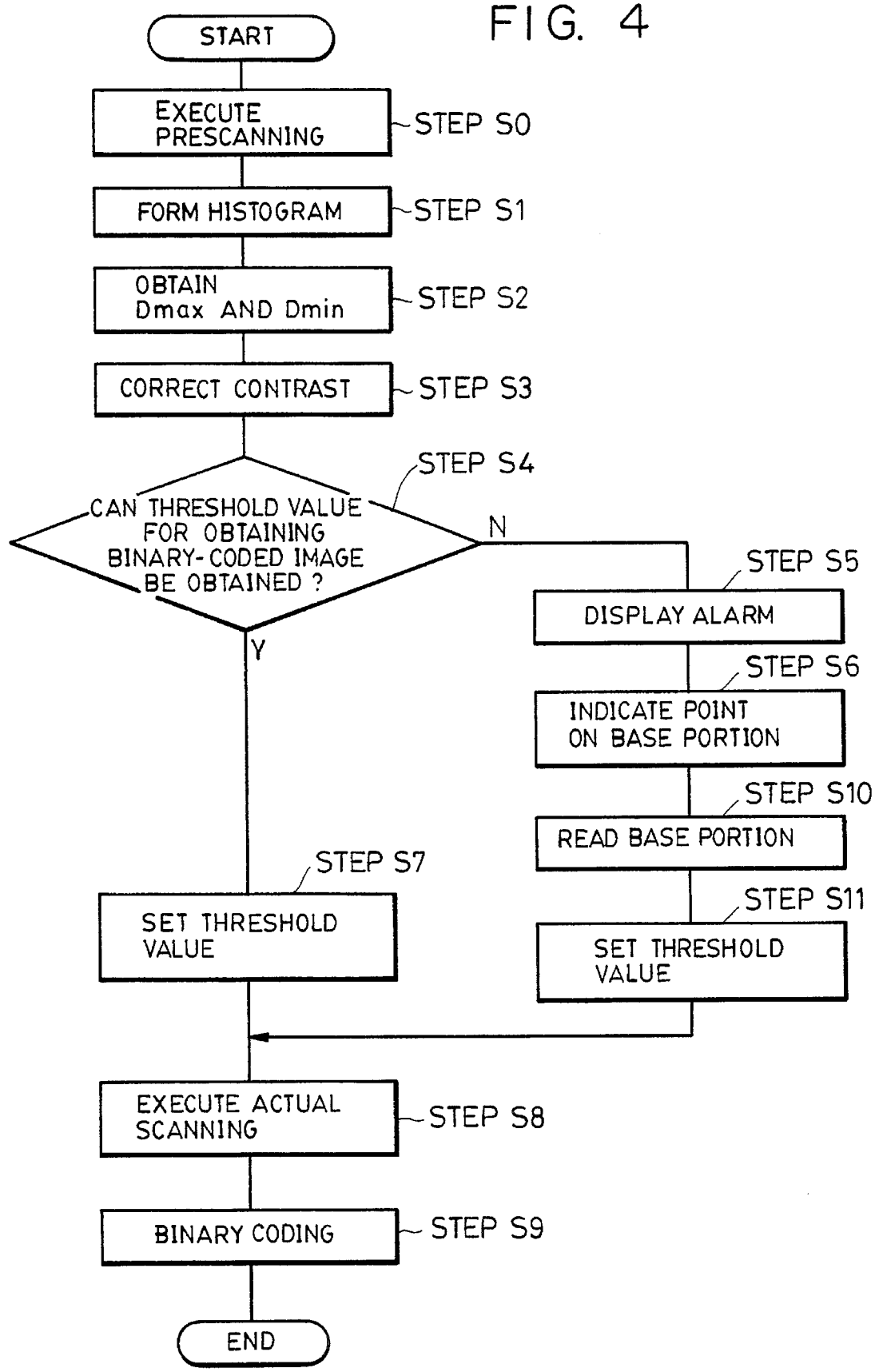
FIG. 4 is a flowchart showing the procedure of image processing operations.

The procedure of operations will be explained according to the flowchart shown in FIG. 4.

First, at step S0, prescanning for forming a density histogram is performed. That is, as in the above-described normal image reading operation, after moving the mirror M31 to the position M32, the image on the microfilm F is read by moving the photosensor 7.

Next, at step S1, a density histogram is formed according to image signals output from the photosensor 7 during the prescanning. That is, the density histogram is formed by the density histogram forming circuit 41, serving as statistical processing means.

For forming the density histogram, all the image signals from the photosensor 7 may be used, or a plurality of sample points may be provided in the image, and the histogram may be formed using image signals corresponding to the sample points.

Next, at step S2, values $D_{max}$ and $D_{min}$ are obtained from the histogram using the threshold-value determination circuit 42. In this case, if data are processed with 256 gradations (for example), contrast correction is performed at step S3 so that the values $D_{max}$ and $D_{min}$ become 255 and 0, respectively, that is, after subtracting the value $D_{min}$ from respective data $D_n$, the resultant values are multiplied by $\{256/(D_{max}-D_{min})\}$.

Figure 6:
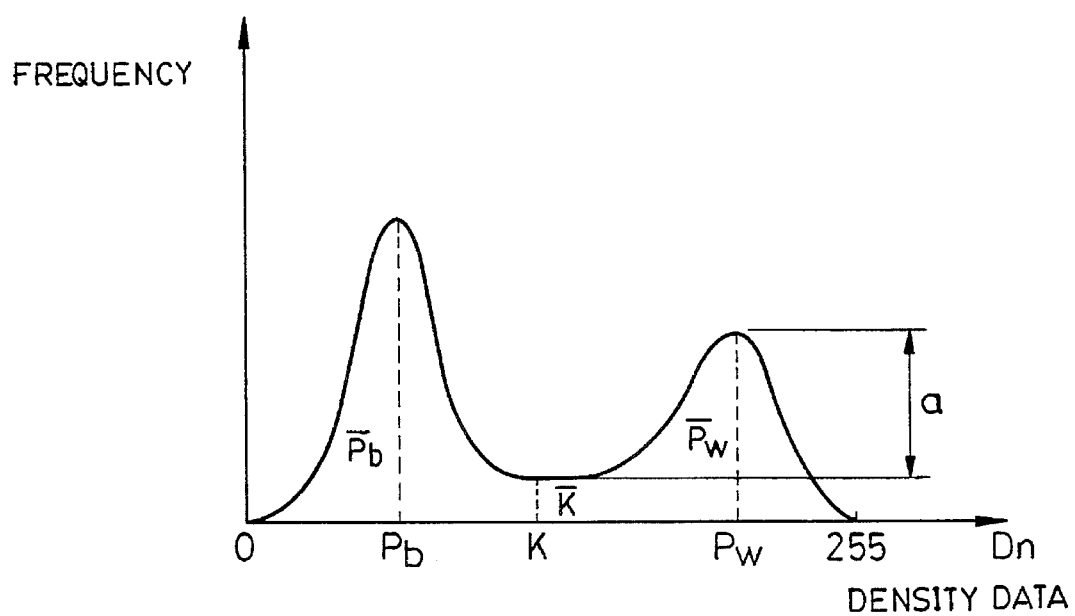
FIG. 6 is a diagram illustrating a standard for contrast determination.
Figure 7:
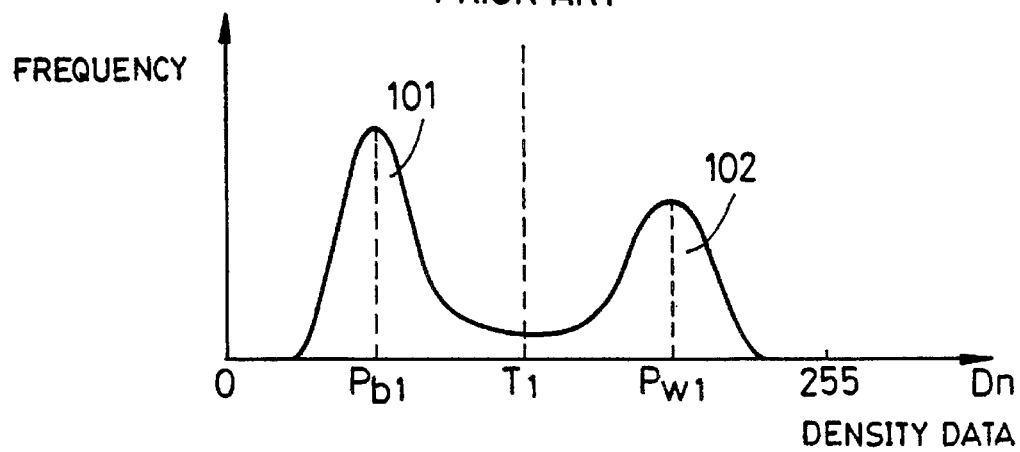
FIG. 7 is a general density histogram.
Figure 8A:
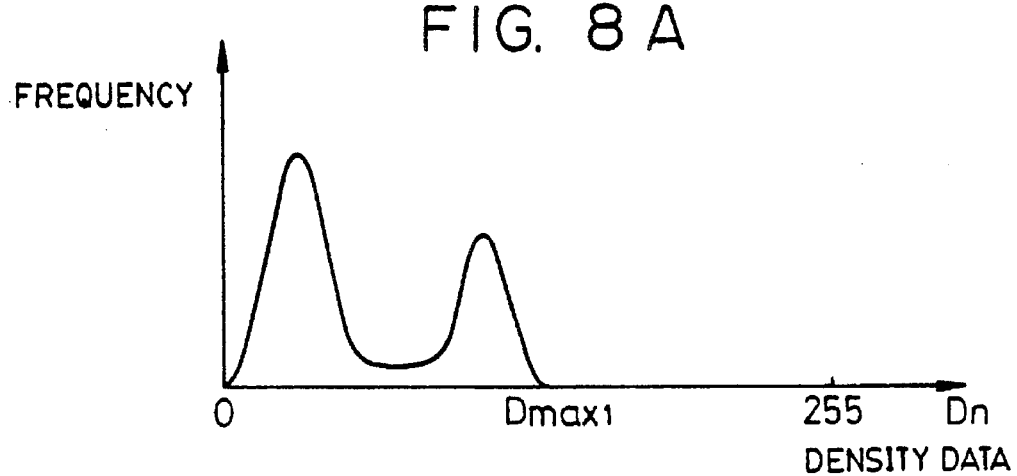
FIG. 8A is a density histogram illustrating the case of blackish contrast as a whole.
Figure 8B:
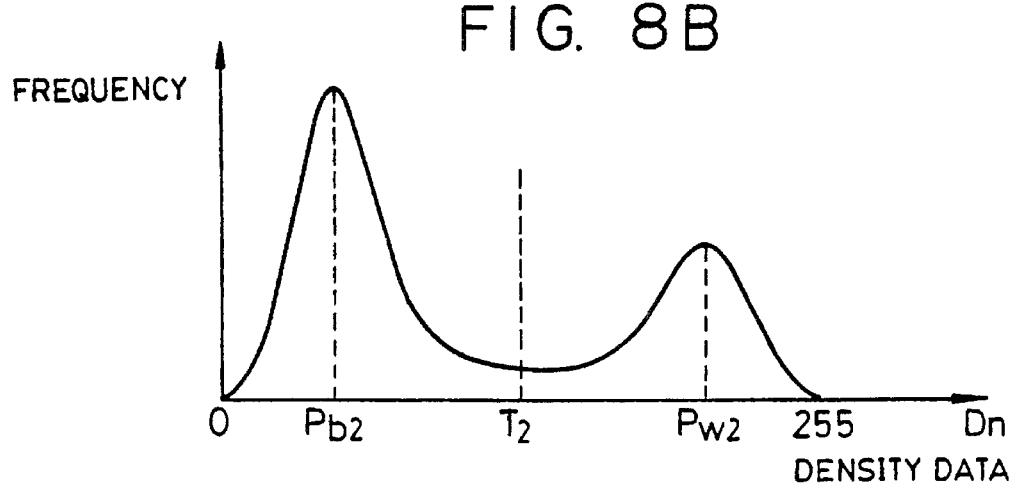
FIG. 8B is a density histogram obtained when the histogram shown in FIG. 8A is subjected to contrast correction.
Figure 9:
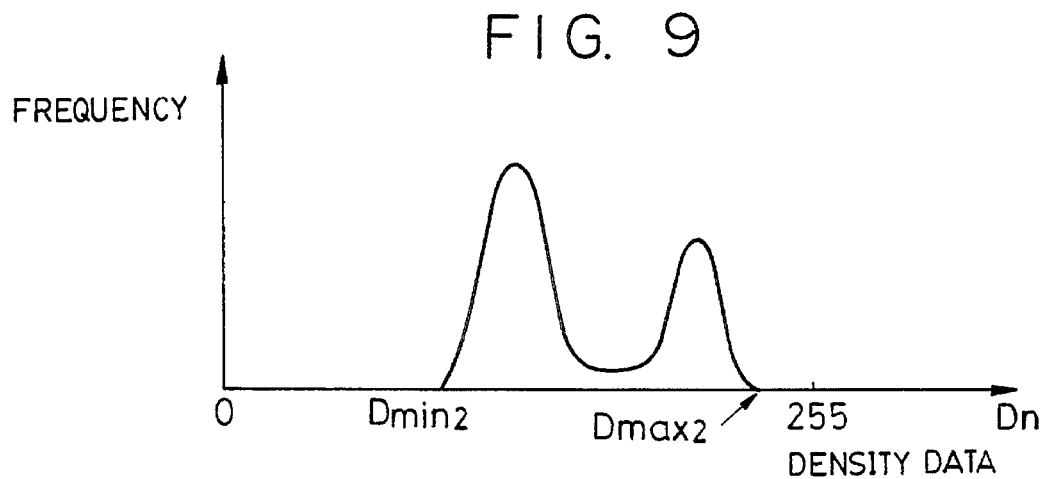
FIG. 9 is a density histogram illustrating the case of whitish contrast as a whole.
Figure 10:
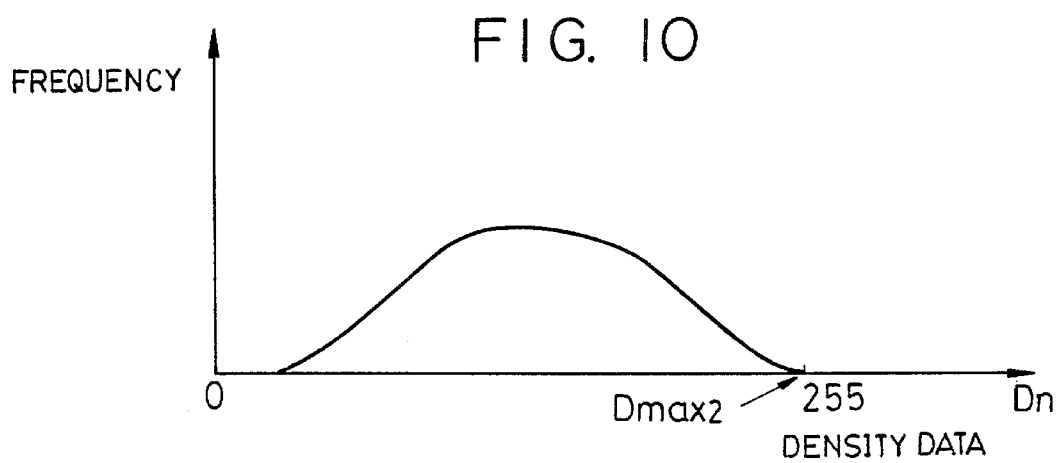
FIGS. 10 and 11 are examples of density histograms which are improper for processing.
Figure 11:
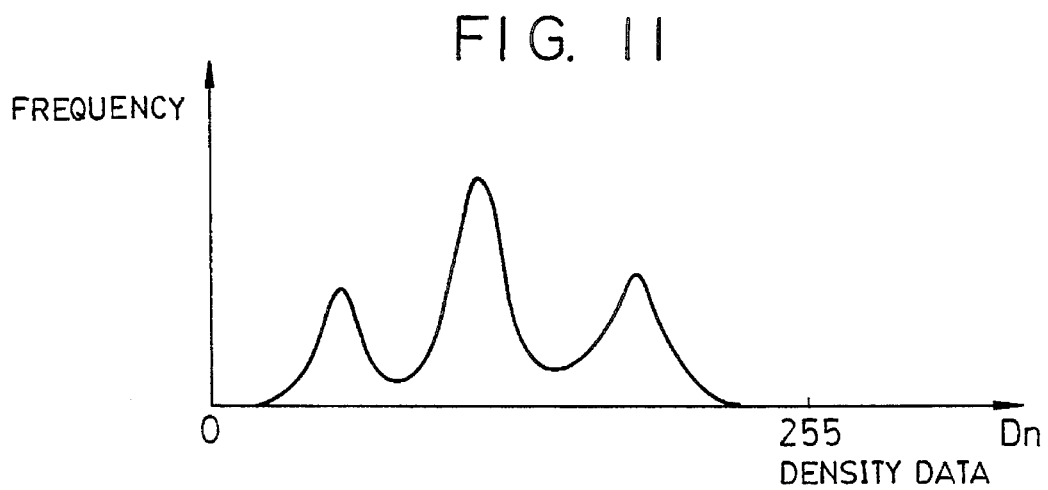

At the next step S4, it is determined whether or not a proper threshold value can be obtained. For that purpose, first, as shown in FIG. 6, inflection points are obtained from a new histogram after contrast correction. If two upwardly convex inflection points are present, and the frequency $\overline{K}$ at a concave inflection point K between the two convex inflection points is separated from the frequencies $\overline{Pb}$ and $\overline{Pw}$ at the two convex inflection points $P_b$ and $P_w$ by at least a predetermined value "a", it is determined that a proper threshold value can be obtained. In that case, the process proceeds to step S7, where the threshold value T is set. In this case, the average value $(P_w+P_b)/2$ of the above-described inflection points $P_w$ and $P_b$ obtained at step S4 may be made the threshold value T, or other suitable values may be used as T.

After the threshold value T is thus determined, the actual scanning of the image of the microfilm F is performed at step S8. That is, after moving the mirror M31 to the position M32, the reading of the image of the microfilm F is performed by again subscanning the photosensor 7.

At step S9, image signals output from the photosensor 7 at the actual scanning are binary-coded using the threshold value T obtained as described above, and the binary-coded data are output to the image forming apparatus 37, such as an LBP or the like.

Figure 5:
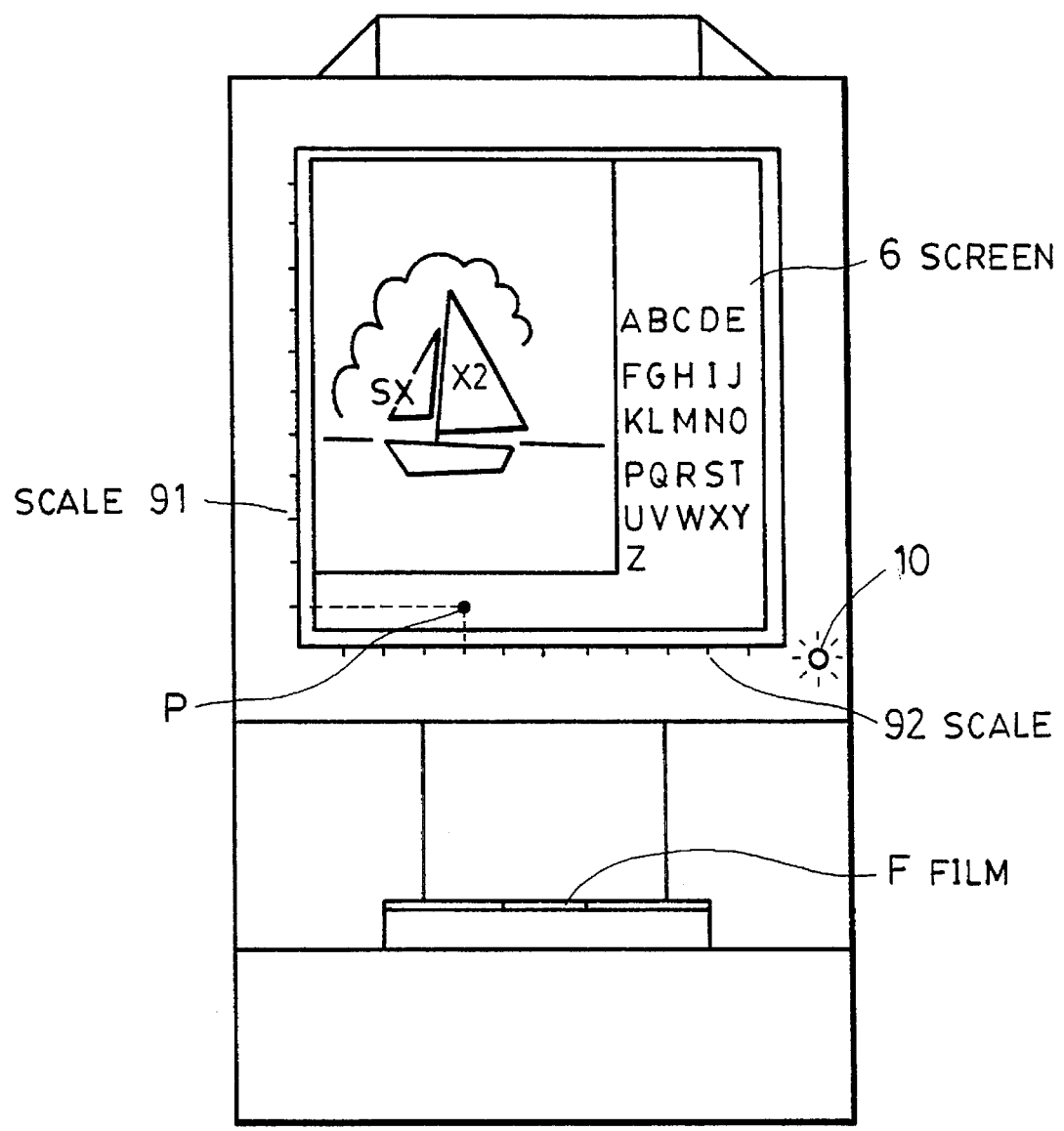
FIG. 5 is a front view of an image reading apparatus according to the present invention.

If the threshold-value determination circuit 42 has determined at step S4 that a proper threshold value cannot be obtained, the process branches to step S5. By transmission of a warning signal to a warning display unit 10 shown in FIG. 2, the warning display unit 10, provided close to the screen 6, is lit, as shown in FIG. 5, to warn the operator that a proper threshold value cannot be obtained for the image. At the same time, the mirror M31 is switched to the monitor optical path, and the image is projected magnified on the screen 6.

The operator thus warned at step S6 obtains an arbitrary point P serving as a basis for threshold determination while watching the magnified image projected on the screen 6, reads the coordinates of the point P by means of scales 91 and 92 provided at two sides of the screen 6, and key-inputs the coordinates from a ten-key (not shown) on an operation unit 36. When the signal of the coordinates input by the key-input operation has been transmitted to the image processing circuit 34, the mirror M31 is switched again to the image reading optical path, the imaging surface 8 is scanned by the photosensor 7, and density data of the assigned coordinate point P are read by the photosensor 7 at step S10.

In the case of a negative film (generally used for a microfilm), the threshold value can be set by adding an empirically obtained value b to the density data value for the point P. In the case of a positive film, the threshold value can be set by subtracting another empirically obtained value c from the density data value for the point P. After thus setting the threshold value by the threshold-value setting circuit 43 at step S11, the imaging surface 8 is actually scanned at step S8 in the same manner as described above. The received density data are sequentially binary-coded by the binary coding circuit 44 at step S9, and the binary-coded image data may be transmitted to the image forming apparatus 37 via the printer interface circuit 35.

In the above-described embodiment, when a warning has been issued, the coordinates of the point P are input from the ten-key on the operation unit 36. Alternatively, a transparent digitizer, serving as a coordinate input apparatus, may be provided on the screen 6, and the coordinates of the point P may be input using a fingertip or a pen point via the digitizer.

In addition to reading an image recorded on a microfilm, an image recorded on a book, a document or the like, may also be read.

Although, in the above-described embodiment, after inputting of the coordinates of the point P, the mirror M31 is switched again to the image reading optical path position, and the density data of the assigned coordinate point P is read by scanning the imaging surface 8, the above-described binary coding of the image by setting the threshold value may be performed with a single scanning of the imaging surface 8 by providing a memory for storing density data at respective points during scanning, obtained by prescanning, and by performing selective reading of density data corresponding to the input coordinates.

As explained above, when it is determined that a threshold value for binary coding cannot be obtained from a density histogram formed by prescanning, warning means warns the operator that satisfactory binary image signals cannot be output (while that means is preferably visual, it could be auditory instead, or also). Hence, it is possible to prevent wasteful use of a recording material.

Furthermore, by only assigning one point on a magnified image projected on a screen, binary coding of the image can be performed making the density at that point a reference. Hence, it becomes possible to obtain a desired binary-coded image even from an image from which a binary-coded image could previously not been obtained.

While the present invention has been described illustratively with reference to the configuration of the preferred embodiment, the present invention is not limited thereto, but various changes and modifications may of course be made within the spirit and scope of the appended claims.

What is claimed is:

1. An image processing apparatus comprising:

input means for inputting image signals representing an image;

designating means for manually designating an arbitrary portion of the image;

processing means for processing the image signals in accordance with a processing condition;

first setting means for setting a first processing condition of said processing means in accordance with a density level of the image in its entirety;

second setting means for setting a second processing condition of said processing means in accordance with a density level of the arbitrary portion of the image designated by said designating means;

discrimination means for discriminating whether or not the first processing condition, set by said first setting means, is suitable for an image processing by said processing means; and selecting means for selecting one of the first and second processing conditions in accordance with the discrimination result of said discrimination means, wherein said selecting means selects the first processing condition when said discrimination means discriminates that the first processing condition is suitable for the image processing, and selects said second processing condition when said discrimination means discriminates that the first processing condition is not suitable for the image processing.

2. An image processing apparatus according to claim 1, wherein said first setting means sets the first processing condition in accordance with a histogram of image density levels of the image signals representing the image in its entirety.

3. An image processing apparatus according to claim 2, wherein said processing means further comprises quantizing means for quantizing the image signals input by said input means, and determination means for determining a threshold value for quantizing the image signals in accordance with this histogram.

4. An image processing apparatus according to claim 2, wherein said processing means further comprises correction means for correcting contrast of the image, and wherein the histogram of a corrected image density level is formed.

5. An image processing apparatus according to claim 2, wherein said discrimination means discriminates whether the histogram is suitable for setting the first processing condition.

6. An image processing apparatus according to claim 1, wherein said input means includes a film reader for reading the image recorded on a film.

7. An image processing apparatus according to claim 1, further comprising displaying means for displaying the discrimination result of said discrimination means.

8. An image processing method comprising:

an inputting step of inputting image signals representing an image;

a processing step of processing the image signals in accordance with a processing condition;

a first setting step of setting a first processing condition to be used in said processing step in accordance with a density level of the image in its entirety;

a designating step of manually designating an arbitrary portion of the image;

a second setting step of setting a second processing condition to be used in said processing step in accordance with a density level of the arbitrary portion of the image designated in said designating step;

a discriminating step of discriminating whether or not the first processing condition, set in said first setting step, is suitable for an image processing in said processing step; and a selecting step of selecting one of the first and second processing conditions in accordance with the discrimination result of said discriminating step, wherein, in said selecting step, the first processing condition is selected when the first processing condition is discriminated to be suitable for the image processing, and the second processing condition is selected when the first processing condition is discriminated to be not suitable for the image processing.

9. An image processing method according to claim 8, wherein, in said first setting step, the first processing condition is set in accordance with a histogram of image density levels of the image signals representing the image in its entirety.

10. An image processing method according to claim 9, further comprising a step of quantizing the image signals input in said input step, and a step of determining a threshold value for quantizing the image signals in accordance with the histogram.

11. An image processing method according to claim 9, further comprising a step of correcting contrast of the image and, wherein the histogram of a corrected image density level is formed.

12. An image processing method according to claim 9, wherein, in said discrimination step, it is discriminated whether or not the histogram is suitable for setting the first processing condition.

13. An image processing method according to claim 8, wherein, in said input step, a film reader reads the image recorded on a film.

14. An image processing method according to claim 8, further comprising a step of displaying the discrimination result of said discrimination step.

* * * * *